(12) United States Patent
Norem et al.

(10) Patent No.: US 8,771,124 B2
(45) Date of Patent: Jul. 8, 2014

(54) CARRIER FOR PLANETARY GEAR SYSTEM

(75) Inventors: Dean A. Norem, Cherry Valley, IL (US); David L. Wakefield, Loves Park, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 115 days.

(21) Appl. No.: 13/350,887

(22) Filed: Jan. 16, 2012

(65) Prior Publication Data

US 2013/0184114 A1 Jul. 18, 2013

(51) Int. Cl.
*F16H 57/04* (2010.01)
*F16H 57/08* (2006.01)

(52) U.S. Cl.
USPC .......................................... 475/159; 475/331

(58) Field of Classification Search
CPC combination set(s) only.
See application file for complete search history.

(56) References Cited

U.S. PATENT DOCUMENTS

| | | | |
|---|---|---|---|
| 5,472,383 A | 12/1995 | McKibbin | |
| 5,597,370 A * | 1/1997 | Nogle | 475/159 |
| 5,830,098 A * | 11/1998 | Kimes | 475/159 |
| 5,910,063 A | 6/1999 | Kato | |
| 5,928,100 A | 7/1999 | Ohtake et al. | |
| 6,223,616 B1 | 5/2001 | Sheridan | |
| 6,758,598 B2 | 7/2004 | Beauvais et al. | |
| 6,929,578 B1 | 8/2005 | Rowell | |
| 7,252,615 B2 * | 8/2007 | Kempf | 475/159 |
| 7,270,620 B2 | 9/2007 | Tiesler et al. | |
| 7,704,178 B2 | 4/2010 | Sheridan et al. | |
| 7,909,140 B2 | 3/2011 | Sugihara et al. | |
| 7,967,712 B2 | 6/2011 | Nakamura et al. | |
| 8,020,665 B2 | 9/2011 | Sheridan et al. | |
| 2006/0223664 A1 * | 10/2006 | Duong et al. | 475/159 |
| 2010/0144479 A1 * | 6/2010 | Nakamura et al. | 475/159 |

FOREIGN PATENT DOCUMENTS

GB 274 396 A 7/1927

OTHER PUBLICATIONS

European Search Report for EP Application No. EP12199127.7, Apr. 25, 2013.

* cited by examiner

*Primary Examiner* — David D Le
*Assistant Examiner* — Mark Manley
(74) *Attorney, Agent, or Firm* — Carlson, Gaskey & Olds, P.C.

(57) ABSTRACT

A planetary gear system includes a sun gear rotatable about an axis. Planetary gears are circumferentially arranged about and intermesh with the sun gear and peripherally with a ring gear. Each of the planetary gears is supported by a journal bearing arranged in a bore in a carrier wall. A carrier supports the journal bearings and is configured to rotate about the axis and carry the planetary gears. The carrier wall supports the journal bearings and has spaced apart lateral surfaces. A scupper is arranged between the lateral surfaces and provides an inlet in one of the lateral surfaces, in this example facing the sun gear. The inlet has a first circumferential dimension, and a passage fluidly interconnects the scupper to one of the journal bearings via the bore. The passage has a second circumferential dimension less than the first circumferential dimension.

13 Claims, 4 Drawing Sheets

US 8,771,124 B2

CARRIER FOR PLANETARY GEAR SYSTEM

BACKGROUND

This disclosure relates to a planetary gear system for a gearbox, and more particularly, a lubrication system for the planetary gears within a rotating carrier.

Epicyclic gear systems are used for a variety of speed change applications. One type of epicyclic gear system uses "planetary" gears, in which circumferentially arranged gears revolve together about a centrally located "sun" gear. The planetary gears are supported by a carrier using journal bearings, for example. The carrier rotates about the same axis as the sun gear and carries the planetary gears. Typically, journal bearings are lubricated using a complex arrangement of fluid passages that are fed by a pressurized lubrication source. Tubes and seals are often used to distribute and provide connections between portions of the fluid passages.

SUMMARY

A planetary gear system includes a sun gear rotatable about an axis. Planetary gears are circumferentially arranged about and intermesh with the sun gear and peripherally with a ring gear. Each of the planetary gears are supported by a removable post that serves as a journal bearing. A carrier supports the journal bearings and is configured to rotate about the axis and carry the planetary gears. The carrier includes a first wall supporting the journal bearings and has spaced apart lateral surfaces. A scupper is arranged between the lateral surfaces and provides an inlet in one of the lateral surfaces, in this example facing the sun gear. The inlet has a first circumferential dimension, and a passage fluidly interconnects the scupper to one of the journal bearings. The passage has a second circumferential dimension less than the first circumferential dimension.

A carrier for a planetary gear system includes a first wall having spaced apart lateral surfaces with circumferentially spaced bores extending through both walls for positioning the planetary gears. Each bore is configured to support a journal bearing. A scupper is arranged between the lateral surfaces and provides an inlet and catch basin in one of the lateral surfaces. The inlet has a first circumferential dimension, and a passage fluidly interconnects the scupper to one of the bores. The passage has a second circumferential dimension less than the first circumferential dimension.

BRIEF DESCRIPTION OF THE DRAWINGS

The disclosure can be further understood by reference to the following detailed description when considered in connection with the accompanying drawings.

DETAILED DESCRIPTION

Figure 1:
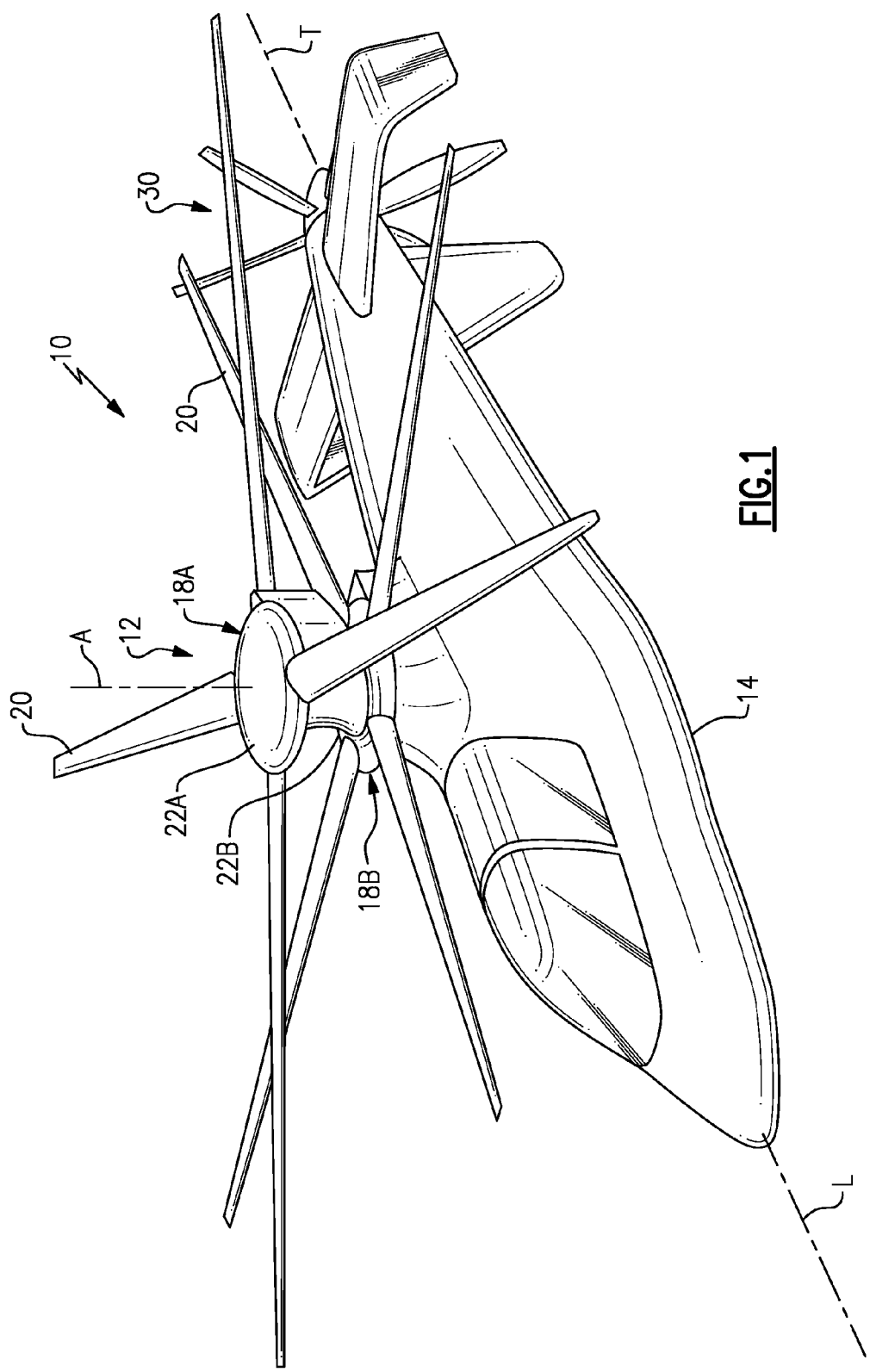
FIG. 1 is a general schematic view of an exemplary rotary wing aircraft embodiment for use with the present disclosure.

FIG. 1 schematically illustrates an exemplary high speed vertical takeoff and landing (VTOL) rotary-wing aircraft 10 having a counter-rotating, coaxial rotor system 12 which rotates about an axis of rotation A. The aircraft 10 includes an airframe 14 that supports a drive system 16 (FIG. 2), which generally includes the rotor system 12, a powertrain system 24, a power plant system 26, and a secondary thrust system 30. The secondary thrust system 30 provides secondary thrust generally parallel to an aircraft longitudinal axis L while the main rotor system 12 operates in an unloaded reverse flow state during a high-speed forward flight profile. Although a particular aircraft configuration is illustrated and described in the disclosed embodiment, other configurations and/or machines, such as high speed compound rotary-wing aircraft with supplemental secondary thrust systems, dual contra-rotating, coaxial rotor system aircraft, turbo-props, tilt-rotor, tilt-wing aircraft and non-aircraft applications will also benefit from the disclosed planetary gear system.

The main rotor system 12 includes an upper rotor system 18A and a lower rotor system 18B. Each rotor system 18A, 18B includes multiple rotor blades 20 mounted to a respective rotor hub 22A, 22B for rotation about a rotor axis of rotation A. Any number of blades 20 may be used with the rotor system 12.

Figure 2:
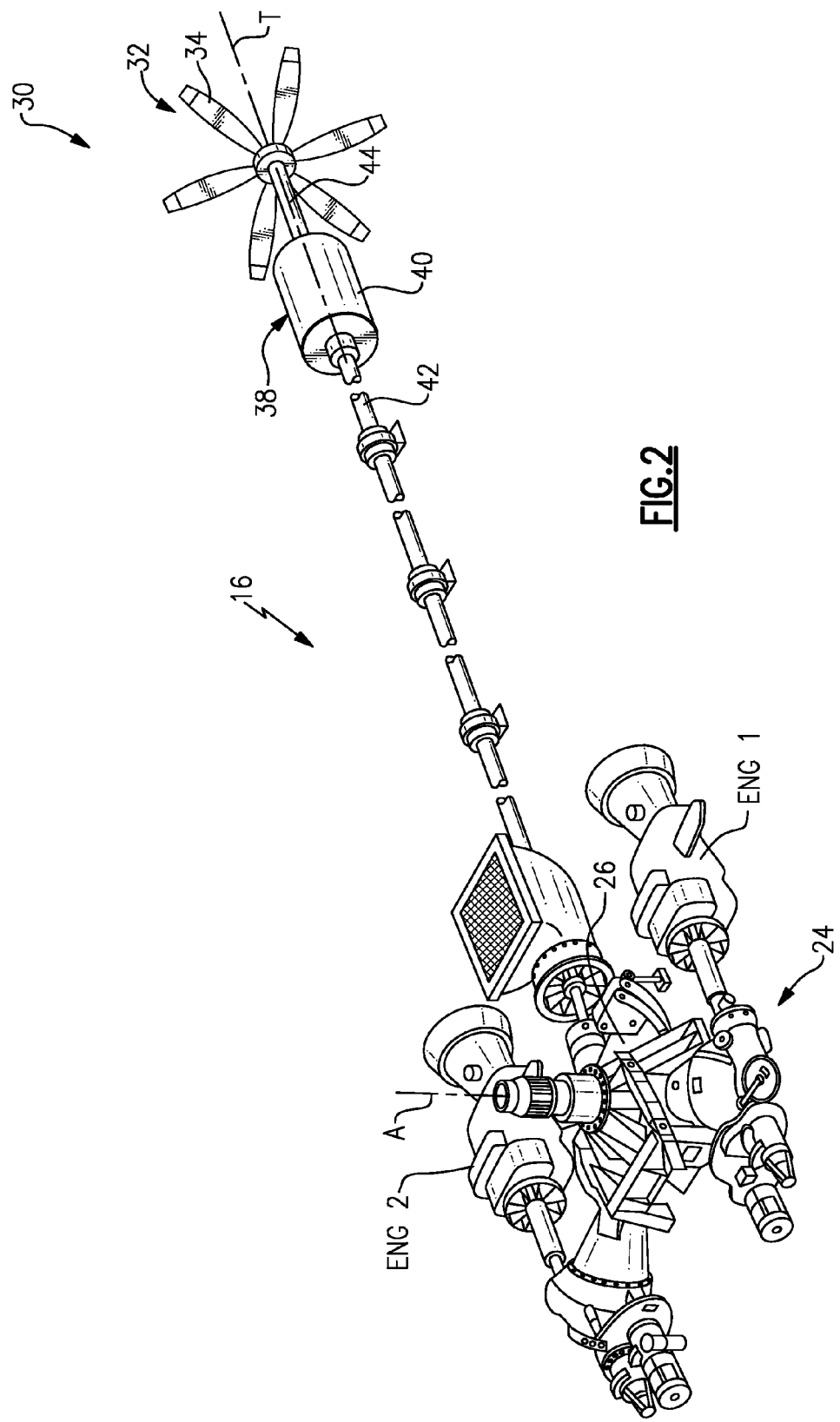
FIG. 2 is a general schematic view of a drive system for the rotary wing aircraft.

With reference to FIG. 2, the powertrain system 24 interconnects the power plant system 26, the rotor system 12 and the secondary thrust system 30. The powertrain system 24 may include various gear systems such as main and combiner gearboxes. The power plant system 26 generates the power available for flight operations to power the main rotor system 12 and the secondary thrust system 30 through the powertrain system 24. The power plant system 26 in the disclosed, non-limiting embodiment includes two engine packages ENG1, ENG2, however, single engine systems as well as multi-engine systems will also benefit the disclosed planetary gear system.

The secondary thrust system 30 in one non-limiting embodiment may be mounted to the rear of the airframe 14 transverse to the axis of rotation A with a rotational axis T thereof oriented substantially horizontal and parallel to an aircraft longitudinal axis L to provide thrust for high-speed flight. It should be understood that other configurations of the secondary thrust system 30 such as a propeller system mounted to each side of the airframe, a lift fan system, or other system alternatively may be utilized. In this disclosed, non-limiting embodiment, the secondary thrust system 30 includes a pusher propeller system 32 including pusher blades 34. Power is transmitted from an input shaft 42 of the drive system 16 through a gearbox 38 to an output shaft 44 to rotationally drive the pusher propeller system 32.

Figure 3:
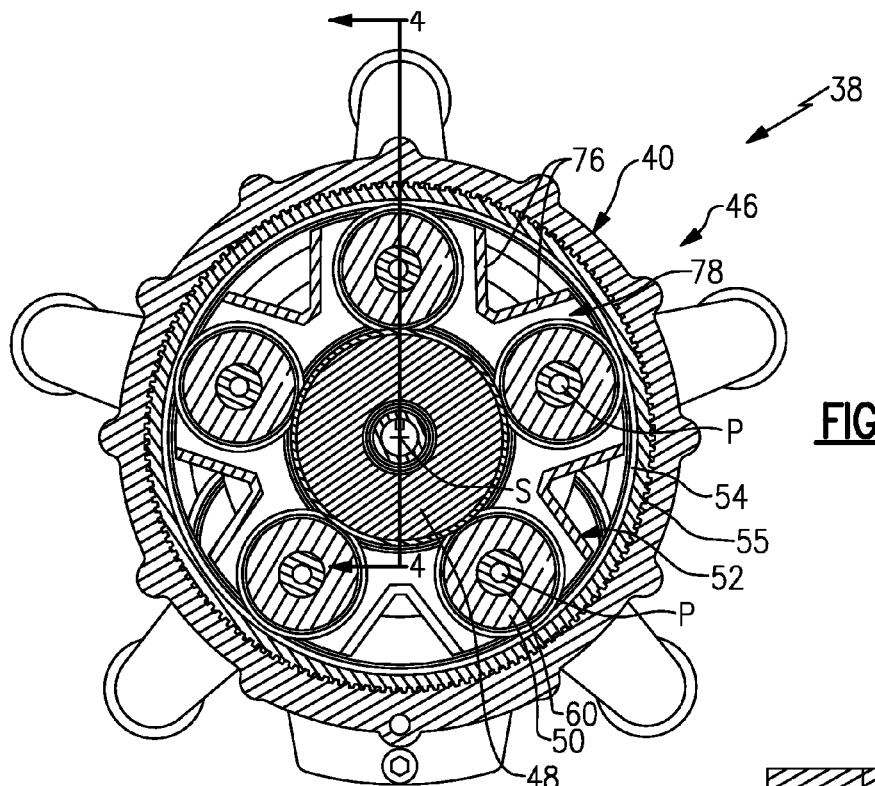
FIG. 3 is a cross-sectional end view of an example planetary gear system for a gearbox of the exemplary aircraft.
Figure 4:
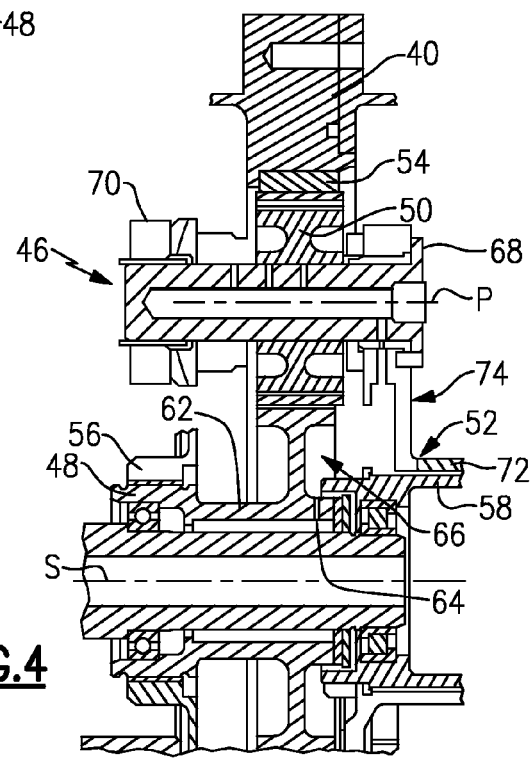
FIG. 4 is a cross-sectional side view of the planetary gear system taken along line 4-4 in FIG. 3.

Referring to FIGS. 3 and 4, a planetary gear system 46 is arranged within the housing 40 of the gearbox 38. The planetary gear system 46 includes a sun gear 48 rotatable about an axis S. Planetary gears 50, which each rotated about an axis P, are circumferentially arranged about and intermesh with the sun gear 48 and a ring gear 54, which is fixed against rotation in this example with an outer spline 55 within the housing 40. The sun gear 48 is splined to an input member 56, which is coupled to the input shaft 42 (FIG. 2).

Each of the planetary gears 50 is supported by a journal bearing 60. A carrier 52, (depicted example is machined from billet steel) supports the journal bearings 60 and is configured to rotate about the axis S along with the planetary gears 50. As the carrier 52 rotates, it collects and coalesces splashed oil within the gear case. The carrier rotation generates centrifugal forces which directs the collected lubrication fluid radially outward. The sun gear 48 includes a hub 62 having one or more apertures 64 that permit lubrication fluid to pass radially through the hub 62 to a cavity 66. Additionally, lube in the center of the adjacent output member 58 is also directed through its bearing and into the sun gear cavity 66.

The carrier 52 includes first and second walls 68, 70 axially spaced apart from and parallel to one another. In one example, connecting walls 76 join the first and second walls 68, 70 to one another to form gear pockets 78 that each receive one of the planetary gears 50. The first and second walls 68, 70 include axial pairs of circumferentially spaced bores 80. Each pair of bores 80 receives a journal bearing 60, which is removable. A bushing 82 is arranged in each bore 80 and supports a journal bearing 60, best shown in FIG. 5. An annular collar 72 is part of carrier 52 and extends axially from the first wall 68, and is splined to an output shaft member 58, which is coupled to the output shaft 44 (FIG. 2).

Figure 5:
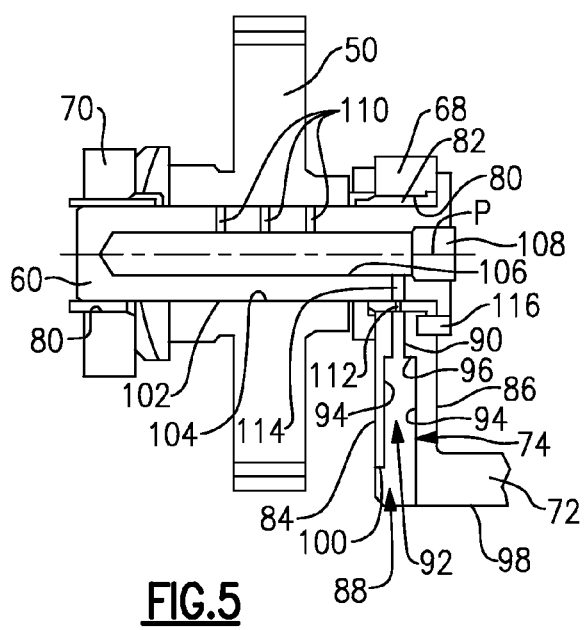
FIG. 5 is an enlarged view of a portion of the planetary gear system shown in FIG. 4.

Referring to FIGS. 4 and 5, the first wall 68 has spaced apart lateral surfaces 84, 86. A void that creates a scupper 74 is arranged between the lateral surfaces 84, 86 and provides an inlet 88, which acts as a catch basin, in one of the lateral surfaces facing the sun gear 48, for example, the first lateral surface 84. The inlet 88 faces the cavity 66 to receive lubrication fluid flung about within the cavity 66. A passage 90 fluidly interconnects the scupper 74 to one of the bores 80 and its respective journal bearing 60. The passage 90 is provided by a radially extending hole, which may be drilled, for example. In the example, the scupper 74 includes a pocket 92 provided by parallel planar lateral interior surfaces 94 adjoined by an arcuate interior surface 96. The pocket 92 may be machined using a woodruff cutter, for example. The carrier 52 includes a central opening 98 that couples to member 58.

The journal bearings 60 include an outer diameter 102. The planetary gears 46 include an inner diameter 104 that mates with the outer diameter 102. The journal bearings 60 include an inner feed passage 106 and one or more radially extending feed holes 110 fluidly interconnecting the inner feed passage 106 to the outer diameter 102. A plug 108 encloses one end of the inner feed passage 106.

The bushing 82 and journal bearing 60 respectively including first and second passageways 112, 114 fluidly connecting the passage 90 and the inner feed passage 106 to one another. An alignment feature 116, such as a dowel or fastener, rotationally fixes the journal bearing 60 and the bushing 82 relative to the carrier 52 to maintain the fluid passages in communication with one another.

In operation, the lubrication fluid in the cavity 66 is received by the inlet 88 of the scupper 74. Centrifugal forces expel the lubrication fluid in the pocket 92 radially outward through the passages 90 and the first and second passageways 112, 114 into the inner feed passages 106. Fluid in the inner feed passages 106 is expelled through their respective feed holes 110 to lubricate the corresponding interface between the outer and inner diameters 102, 104.

Figure 6:
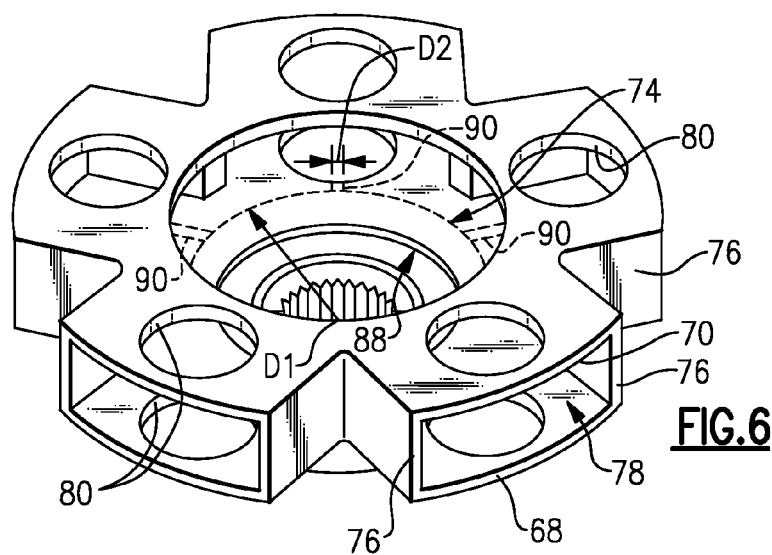
FIG. 6 is a perspective view of one example carrier for the disclosed planetary gear system.

The inlet 88 has a first circumferential dimension D1. The passage 90 has a second circumferential dimension D2 less than the first circumferential dimension D1. The first circumferential dimension D1 is sized sufficiently large to collect an adequate amount of lubrication fluid for lubricating the journal bearings 60. In one embodiment, shown in FIG. 6, the scupper 74 includes a large common annular pocket 92 circumscribing the central opening 98 and feeds all bores and journal bearings. The inlet 88 is provided by an inner diameter 100 at the first lateral surface 84. In this example, the first circumferential dimension D1 corresponds to the entire inner diameter 100. Multiple passages 90 extend from the annular pocket 92 to interconnect to each corresponding hole 80.

Figure 7:
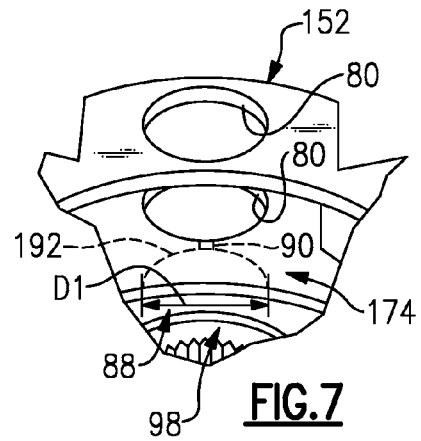
FIG. 7 is a perspective view of another example carrier.

In another example shown in FIG. 7, the carrier 152 includes a scupper 174 having multiple discrete arcuate pockets 192 arranged circumferentially about the central opening 98. Each passage 90 fluidly interconnects one of the arcuate pockets 192 to one of the bores 80. The first circumferential dimension D1 corresponds to a width of the arcuate pocket 192.

Although an example embodiment has been disclosed, a worker of ordinary skill in this art would recognize that certain modifications would come within the scope of the claims. For that reason, the following claims should be studied to determine their true scope and content.

What is claimed is:

1. A planetary gear system comprising:
   a sun gear rotatable about an axis;
   planetary gears circumferentially arranged about and intermeshing with the sun gear, each of the planetary gears supported by a journal bearing;
   a carrier supporting the journal bearings and configured to rotate about the axis and carry the planetary gears, the carrier including a first wall supporting the journal bearings and having spaced apart interior lateral surfaces, and a scupper arranged between the lateral surfaces and providing an inlet in one of the lateral surfaces facing the sun gear, the inlet having a first circumferential dimension, and a passage fluidly interconnecting the scupper to one of the journal bearings, the passage having a second circumferential dimension less than the first circumferential dimension;
   a bushing arranged in the bore between the first wall and the journal bearing, the bushing and journal bearing respectively including first and second passageways fluidly connecting the passage in the carrier and the feed passage to one another; and
   an alignment feature rotationally fixing the journal bearing and the bushing relative to the carrier.

2. The system according to claim 1, wherein the scupper includes a pocket provided by parallel planar lateral interior surfaces adjoined by an arcuate interior surface.

3. The system according to claim 2, wherein the carrier includes a central opening, and the scupper includes an annular pocket circumscribing the central opening and including an inner diameter at the one of the lateral surfaces, the first circumferential dimension corresponding to the inner diameter, and comprising multiple passages, each passage extending from the annular pocket to interconnect to a corresponding journal bearing.

4. The system according to claim 2, wherein the scupper includes multiple discrete arcuate pockets, and comprising multiple passages, each passage fluidly interconnecting one of the arcuate pockets to one of the journal bearings, the first circumferential dimension corresponding to a width of the arcuate pocket.

5. The system according to claim 1, wherein the carrier includes a second wall spaced apart from and parallel to the first wall, the first and second walls including axial pairs of circumferentially spaced bores, each pair of bores removably receiving a journal bearing.

6. The system according to claim 5, wherein the journal bearings include an outer diameter, and the planetary gears include an inner diameter mating with the outer diameter, the journal bearings including a feed passage and a radially extending feed hole fluidly interconnecting the feed passage to the outer diameter.

7. The system according to claim 6, wherein the passage in the carrier is provided by a radially extending hole.

8. The system according to claim 1, wherein the sun gear includes a hub with an aperture configured to direct a lubricating fluid into a cavity adjacent to the scupper inlet.

9. A carrier for a planetary gear system comprising:

a first wall having spaced apart interior lateral surfaces with circumferentially spaced bores extending through the first wall, a second wall spaced apart from and parallel to the first wall, the first and second walls including axial pairs of circumferentially spaced bores, each pair of bores configured to support a rotationally fixed journal bearing on which a gear is mounted for rotation, and a scupper arranged between the lateral surfaces and providing an inlet in one of the lateral surfaces, the inlet having a first circumferential dimension, and a passage fluidly interconnecting the scupper to one of the bores, the passage having a second circumferential dimension less than the first circumferential dimension, the journal bearing including an axially extending inner feed passage in fluid communication with the passage and the scupper;

a bushing arranged in the bore between the first wall and the journal bearing, the bushing and journal bearing respectively including first and second passageways fluidly connecting the passage in the carrier and the feed passage to one another; and an alignment feature rotationally fixing the journal bearing and the bushing relative to the carrier.

10. The carrier according to claim 9, wherein the scupper includes a pocket provided by parallel planar lateral interior surfaces adjoined by an arcuate interior surface.

11. The carrier according to claim 10, wherein the carrier includes a central opening, and the scupper includes an annular pocket circumscribing the central opening and including an inner diameter at the one of the lateral surfaces, the first circumferential dimension corresponding to the inner diameter, and comprising multiple passages, each passage extending from the annular pocket to interconnect to a corresponding bore.

12. The carrier according to claim 10, wherein the scupper includes multiple discrete arcuate pockets, and comprising multiple passages, each passage fluidly interconnecting one of the arcuate pockets to one of the bores, the first circumferential width corresponding to a width of the arcuate pocket.

13. The carrier according to claim 9, wherein the first and second walls are provided by a one-piece structure.

* * * * *